US005339210A

United States Patent [19]

Howell

[11] Patent Number: 5,339,210

[45] Date of Patent: Aug. 16, 1994

[54] DC CIRCUIT INTERRUPTER

[75] Inventor: Edward K. Howell, Hendersonville, N.C.

[73] Assignee: General Electric Company, New York, N.Y.

[21] Appl. No.: 916,752

[22] Filed: Jul. 22, 1992

[51] Int. Cl.[5] ........................ H02H 7/00; H01H 9/30; H01H 9/56

[52] U.S. Cl. ........................................... 361/9; 361/10

[58] Field of Search ....................................... 361/2-13

[56] References Cited

U.S. PATENT DOCUMENTS 4,631,621 12/1986 Howell ................................ 361/13
4,636,907 1/1987 Howell ................................ 361/13
4,723,187 2/1988 Howell ................................ 361/13

*Primary Examiner*—A. D. Pellinen
*Assistant Examiner*—Ronald W. Leja
*Attorney, Agent, or Firm*—Richard A. Menelly

[57] ABSTRACT

To avoid arcing when the breaker is opened, load current is diverted from a circuit breaker, before it opens, to a pulse forming circuit containing a precharged capacitor and a switch. Load current normally flows from a source of electric power to a load through a network comprising the breaker and a series connected controlled impedance. The pulse forming circuit is connected across the network. When load current is to be interrupted, the switch is closed to discharge a current pulse through the network, and the impedance of the controlled impedance is increased. These actions divert load current from the network to the pulse forming circuit. The breaker is then opened. The voltage across the capacitor first linearly increases from the precharge voltage to zero and then tends to increase in magnitude with an opposite polarity, i.e. that of the source of electric power. The voltage magnitude with opposite polarity then attainable across the capacitor is limited to a very low value, such as by a diode or SCR connected in parallel circuit with the capacitor. This limits the voltage across the opening breaker to avoid voltage breakdown across its contacts. It also permits use of a unipolar, e.g. electrolytic capacitor to increase the time during which the breaker can fully open. After the breaker is opened, the switch is opened, i.e. turned off, and remaining energy in the circuit is dissipated by a varistor. Various switching turn on and turn off circuits are disclosed.

5 Claims, 4 Drawing Sheets

DC CIRCUIT INTERRUPTER

BACKGROUND OF THE INVENTION

This application is related to concurrently filed and co-pending application Ser. No. 07/916,754.

The subject invention relates to arrangements for rapidly interrupting DC load current in a power line interconnecting a source of electric energy and a load and, particularly, for rapidly opening circuit breaking devices without significant arcing.

When DC load currents of substantial magnitude are interrupted by interrupting devices, such as circuit breakers or switches, the arc produced across the opening contacts of the interruption device prohibits interruption until the arc voltage drop is made to exceed the DC source voltage, or until the arc is de-ionized by diverting arc current to a parallel path for a time sufficient for de-ionization and recovery of breakdown voltage at least equal to the source voltage. Arc energy erodes the metallic contacts, erodes and deposits conductive material on insulator surfaces in the vicinity, emits contaminants to the atmosphere, and delays completion of current interruption by the time required for de-ionization and recovery of breakdown voltage. Thus, the reduction of arc energy, particularly its elimination, can provide significantly faster interruption of DC current, with smaller contacts and insulators, and with higher reliability.

Applicant's U.S. Pat. No. 4,636,907 entitled "Arcless Circuit Interrupter", which is assigned to the assignee of the subject application and is herein incorporated by reference, discloses an arrangement for diverting load current, prior to opening of the interruption device, to a parallel current interrupter circuit, thereby essentially eliminating the arc. It discloses a controlled impedance circuit in series with the interruption device. Responsive to the interruption signal, the impedance value is stepped up from a low value to produce a sufficient voltage drop to fully divert the load current prior to the opening of the interruption device. Applicant's U.S. Pat. No. 4,658,227 entitled "High Speed Magnetic Contact Driver", which is also assigned to the assignee of the subject application and is herein incorporated by reference, discloses an interruption device having exceptionally fast and predictable opening of the contacts. Applicant's U.S. Pat. No. 4,723,187 entitled "Current Commutation Circuit", which is also assigned to the assignee of the subject application and is herein incorporated by reference, discloses a current interrupter circuit having exceptionally low initial impedance which enables very rapid transfer of current from the interrupting device, and further teaches the use of the series controlled impedance and the high speed contact driver in combination. This combination has been found to provide very fast current interruption in both AC and DC applications. However, for strictly DC uses, wherein the direction of current flow and voltage polarity is fixed, certain simplifications can be made which both improve performance and reduce the cost and complexity of the interrupter.

OBJECTS OF THE INVENTION

It is an object of this invention to provide an improved interruption arrangement capable of interrupting DC currents of large magnitude with minimal arcing.

It is a further object to provide such an interruption arrangement which can conduct substantial current continuously without appreciable power loss.

It is yet an additional object to provide a very rapid interruption of current without producing excessive current or voltage transients.

SUMMARY OF THE INVENTION

In accordance with one aspect of the invention, the circuit interrupter comprises first switching means in series combination with controlled impedance means to constitute a network for the flow of load current from a source of electric power to a load.

The controlled impedance means is preferably a saturable reactor which is a low impedance in the normal conduction of load current and becomes a high impedance upon reversal of current. This change in impedance facilitates current diversion and prevents significant reverse current in the switching means, thereby enabling the switching means to be opened without arcing or deterioration. Alternatively, the controlled impedance means may be a solid state switch means with a control signal supplied to it to cause the change in impedance upon, or just before, reversal of current.

The interrupter has a current diversion circuit connected across the network. This, preferably, comprises pulse forming means such as a capacitance means precharged to a predetermined voltage, and serially connected second switching means. Responsive to a load current interruption signal, the pulse forming means, e.g. by closure of the second switching means, supplies the network a current pulse having a peak magnitude at least equal to, and a direction opposite to, the load current. The network of the first switching means and the controlled impedance means is connected in circuit with the current diversion circuit so that the load current is diverted through the capacitance means and the second switching means of the diversion circuit in response to the current pulse. The first switching means is opened, responsive to the load current interrupting signal, after the load current has been diverted from the network and before voltage across the network becomes high enough to cause breakdown of the switching means.

The diverted load current charges the capacitance means such that its voltage would substantially increase, with a polarity of the voltage of the source of power supplying the load current. In case where the capacitance means is initially precharged to provide the current pulse, the load current initially discharges the capacitance means and subsequently recharges it in opposite polarity, i.e. the polarity of the power source. The voltage of the capacitance means thus descends from the precharge voltage to zero and then ascends with opposite polarity. When the contacts of the first switching means commence to open, the voltage across the contacts approximates the voltage across the capacitance means. The first switching means should therefore fully open while such voltage is insufficient to cause a voltage breakdown. For this purpose the voltage across the capacitance means is maintained at an adequately low level for a time sufficient to fully open the first switching means. Some embodiments of the invention utilize for this purpose unidirectional means connected in a circuit across said capacitance means and poled to limit the voltage. This additionally permits an electrolytic capacitor of high capacitance value to be used for the capacitance means. This aids in increasing the time during which the first switching means may be opened.

In accordance with another aspect of the invention, the second switching means is opened upon opening of the first switching means and the remaining energy in the current diversion circuit is then diverted from the second switching means. Energy is then, preferably, diverted to a snubber circuit and a voltage clamping device. The snubber circuit produces a rapid rise in voltage, usually above the voltage magnitude of the power source so as to cause the voltage clamping means, e.g. varistor, to conduct and dissipate remaining energy from the current diversion circuit. Various embodiments are disclosed for turn-on and turn-off of the second switching means and of energy diversion arrangements. These include arrangements for turning off the second switching means in response to a circuit condition, such as the voltage reversal across the capacitance means.

DESCRIPTION OF THE PREFERRED EMBODIMENT

Figure 1:
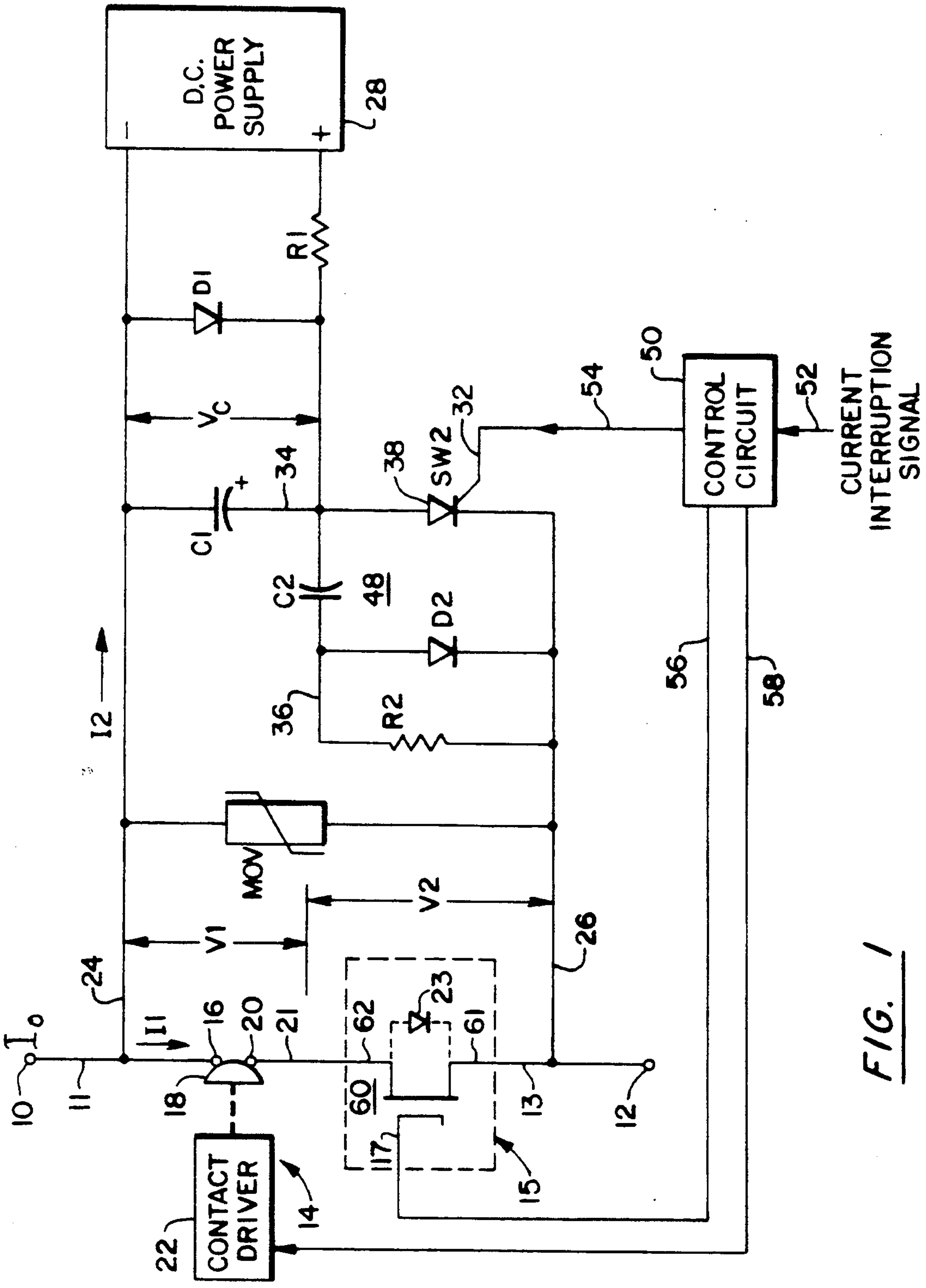
FIG. 1 is a schematic representation of one embodiment of the subject invention using a MOSFET transistor as the controlled impedance.

FIG. 1 illustrates one implementation of an arcless current interruption system capable of interrupting current flow of high magnitudes provided by a d-c power source. Terminals 10 and 12 are adapted for connection to an external circuit comprising, respectively a power source and a load. These terminals are interconnected by conductor 11, high speed mechanical switch 14, controlled impedance circuit 15 and conductor 13. The preceding components thus constitute a network for conduction of load current between the power source and load. High speed switch 14 comprises fixed stationary contacts 16 and 20 and a movable bridging contact 18 that is normally closed, but can be opened by its contact driver 22. Switch 14 preferably is of the type disclosed in previously referenced U.S. Pat. No. 4,658,227. In FIG. 1 controlled impedance circuit 15 is shown as an n-channel enhancement-mode MOSFET transistor 60 having its drain 61 connected to conductor 13 and its source 62 connected to conductor 21 and thence to switch 14. Also shown, in phantom, is the parasitic diode 23 inherent between source and drain of conventional MOSFET transistors.

FIG. 1 further illustrates a current diversion circuit. A current capacitor C1 is connected by conductor 24 to conductor 11 and by conductor 34 to solid state switch SW2, shown here as a gate turn-off, "GTO" thyristor 38, and thence by conductors 26 and 13, in parallel with the network of switch 14 and controlled impedance circuit 15. A d-c power supply 28 is connected to conductor 24 and through resistor R1, of relatively high resistance, to conductor 34 to precharge capacitor C1 to a voltage $V_{cc}$ with conductor 34 positive with respect to conductor 24. The serially connected switch SW2 and the precharged capacitor C1 constitute a pulse forming circuit that is directly connected across the network comprising high speed switch 14 and controlled impedance 15. Switch SW2 is normally turned off, but is turned on responsive to a current interruption signal to discharge capacitor C1 as subsequently described.

A rectifier diode D1 is connected with its anode to conductor 24 and its cathode to conductor 36, in parallel with switch 38. A snubber network 48 comprises capacitor C2 connected from conductor 34 to conductor 36, and current limiting resistor R2 and diode D2 connected in parallel from conductor 36 to conductor 26. Diode D2 has its anode connected to conductor 36 and its cathode connected to conductor 26. Optionally, but preferably, a voltage clamping device such as a metal oxide varistor MOV is also connected across conductors 24 and 26.

Control circuit 50 controls current interruption. It receives a current interrupt signal on input conductor 52 and in response thereto provides three output signals. A first output signal is supplied by conductor 56 to the controlled impedance 15 to switch the controlled impedance circuit from its normal low impedance state to a higher impedance state. Conductor 56 is connected to gate 17 of field effect transistor 60 of the controlled impedance circuit. A second output signal, on conductor 54, turns on switch SW2. Conductor 54 is connected to the gate 32 of gate turn off thyristor 38. A third output signal is supplied by conductor 58 to the contact driver 22 to open bridging contact 18 of the high speed switch 14.

In normal operation when the power source supplies current to the load, load current I0 flows entirely from terminal 10, through conductor 11, switch 14, controlled impedance 15, and conductor 13 to terminal 12. Current, I1, through this network thus is equal to the load current I0. The voltage drop across switch 14, indicated by voltage vector V1, is extremely low, typically less than 100 millivolts. Normally the voltage drop across the controlled impedance 15 is also very low such that load current flowing through it produces a very low voltage drop V2, comparable with voltage drop V1 of switch 14.

When the load current is to be interrupted a current interruption signal is supplied on conductor 52 to control circuit 50. The latter provides a signal on conductor 56 to the controlled impedance circuit 15 to switch the latter to a high impedance state and to cause its voltage V2 to rise with conductor 21 being positive with respect to conductor 13. In a controlled impedance circuit of the type comprising a solid state device, when the latter is turned off its voltage rises to a maximum positive clamping voltage of the circuit. Simultaneously, a signal is supplied by control circuit 50 via conductor 54 to turn on the normally open second switch SW2, i.e. a positive voltage and current is applied to the gate of GTO 38. Capacitor C1 is precharged by d-c power supply 28 to a voltage $V_{cc}$, e.g. 10 volts, with the polarity of conductor 34 being positive with respect to that of conductor 24, thus applying a forward bias to solid state switch SW2, i.e. the GTO 38. Turning on switch SW2 applies the capacitor voltage $V_c$ (which then equals the precharge voltage $V_{cc}$), minus the voltage of the controlled impedance, V2, and minus the forward conduction drop of the second switch SW2, i.e. GTO 38, to the loop inductance of the path comprising the high speed switch 14, capacitor C1, second switch SW2 and the controlled impedance circuit 15. These actions cause the rapid transfer of load current I0 from the network of high speed switch 14 and the controlled impedance circuit 15 to the current diversion circuit that includes capacitor C1, diode D1 and second switch 38. Thus load current I0 is rapidly diverted from the path of current I1 to that of current I2. Current I1 decreases and current I2 rises at a rate determined by the net voltage, i.e. the precharge voltage $V_{cc}$ less the voltage across second switch 38 less the voltage across the controlled impedance 15, divided by the aforesaid loop inductance of the path of current I2. When the magnitude of I2 becomes equal to that of the load current I0, the current I1 in the network comprising high speed switch 14 and the controlled impedance 15 becomes zero. The voltage V2 across the controlled impedance 15 becomes equal to the capacitor voltage $V_c$, minus the voltage drop across the second switch 38, with conductor 21 being negative with respect to conductor 13. Operation of the controlled impedance circuit is described subsequently. With I2=I0 and assuming a reasonably constant load current, the voltage $V_c$ on capacitor C1 now changes linearly with time. Voltage $V_c$ follows a linear ramp from the precharge voltage $V_{cc}$ of a first polarity to zero volts and then continues to increase of a second polarity, i.e. the polarity of the voltage of the source of electric power. If high speed switch 14 has not opened when voltage V2 reaches the positive clamping voltage of the controlled impedance circuit 15, current I1 will resume through switch 14. Switch 14 may, however, be opened successfully during the time when voltage is less in absolute magnitude than the clamping voltage, of corresponding polarity, of the controlled impedance circuit 15. High speed switch 14 may then be opened with no arcing or contact deterioration, as current I1 is zero and will remain zero if V1, the voltage across capacitor C1 and thus the voltage across the high speed switch 14, does not exceed at any time the breakdown voltage of the contact gap of the contacts of the high speed switch 14. Successful current interruption is dependent upon the proper selection of components to provide an adequate time for opening switch 14 and reaching a gap spacing of sufficient breakdown voltage strength. In the circuit of FIG. 1 the time available for opening switch 14 is the time interval during which capacitor voltage $V_c$ is less than the corresponding clamping voltages of the controlled impedance circuit 15. Since capacitor voltage $V_c$ is initially charging on a linear ramp, the time to traverse from the negative to the positive clamping voltage is given by $t=(C^*v)/i$. For example, assume a negative clamping voltage, Vm−, of −10 volts, a positive clamping voltage, Vm+, of +1 volt, a capacitance of 100 microfarads and a load current of 100 amperes. The time would be $t=100^*10^{-6}{}^*11/100=11^*10^{-6}$ or 11 microseconds.

Reference is now made to the controlled impedance circuit 15, and its interaction with the other circuit components of FIG. 1 which provides increased time for opening the high speed switch 14. MOSFET transistor 60 of controlled impedance circuit 15 has its source and drain terminals, 62 and 61, connected inversely from the usual connections. MOSFET transistors have a parasitic diode 23 inherent between source and drain. As illustrated in FIG. 1, diode 23 is poled for conduction from source to drain. During load current conduction, gate terminal 17 receives a constant positive voltage with respect to source 62. The magnitude of this voltage is somewhat greater than the threshold voltage for that transistor but less than the gate breakdown voltage. This achieves maximum conductivity and minimum energy loss in the transistor. During normal current conduction, current I1, equal to load current I0, flows through the highly conductive channel of MOSFET 60 from source to drain, which direction is opposite to the normal operating mode for that type of transistor.

Interruption of load current I0 is initiated by first reducing to zero the control signal voltage, applied by conductor 56 to gate 17, with respect to the source of power and conductor 21, as rapidly as possible, to render the transistor non-conductive. Current I1, still equal to load current I0, then charges transistor and circuit capacitance, raising the positive voltage V2 across the transistor until the forward conduction voltage Vm+ of parasitic diode 23 is reached, whereupon current I1 flows through diode 23. Diode 23 then functions as a voltage clamping device. Simultaneously, as previously described, solid state switch 38 is rendered conductive, such as by the application of a positive voltage and current to gate 32 of the GTO, which applies the capacitor voltage $V_c=V_{cc}$ plus the transistor voltage V2=Vm to the loop inductance associated with switch 14, capacitor C, switch 38 and transistor 15 to cause the rapid transfer of load current I0 from the path of current I1 to that of current I2. When current I1 becomes zero, voltage V2 becomes equal to capacitor voltage $V_c$ minus the voltage drop across switch 38, with conductor 21 negative with respect to conductor 13. The precharge voltage $V_{cc}$ is selected such that the absolute magnitude of V2 does not exceed the negative clamping voltage, Vm−, of Mosfet 60, i.e. the reverse avalanche voltage of parasitic diode 23. Current I2, now equal to load current I0 and relatively constant, causes the voltage $V_c$ on capacitor C1 to follow a linear ramp. This ramp commences from precharge voltage $V_{cc}$ of a first polarity to zero and, presuming that switch 14 has opened, thence reversing and increasing in a second polarity to the forward conduction drop of diode D1, typically about one volt. Diode D1 thus limits the maximum amplitude of second polarity attainable across capacitor C1. When $V_c$ approaches zero, if switch 14 has not opened, voltage V2 across MOSFET 60 will be equal to the forward voltage drop of diode 23 and current I0 will transfer back from current I2 to current I1. Thus arcless interruption is obtained by the opening of switch 14 during the time interval from initiation of conduction of switch 38 to the voltage $V_c$ across capacitor C1 reaching nearly zero. Since reversal of voltage $V_c$ is limited to such a low value, capacitor C1 may be a polarized, i.e. unipolar, electrolytic type having a very high value of capacitance, thereby providing a relatively small rate of change of capacitor voltage as given by $dv/dt=I0/C1$, hence a relatively long time interval for successful opening of switch 14. For example, where $V_{cc}=10$ volts, with I0=100 amperes and C1=1000 microfarads, the time interval is $t=V_{cc}{}^*C1/I0=100$ microseconds. After switch 14 has opened, current $I2=I0$ charges capacitor C1 to the conduction voltage of diode D1, then flows through diode D1 and GTO switch 38, impressing a low voltage V1 across the open switch 14 equal to the sum of the voltage drops across D1 and the GTO, typically on the order of 3 volts. This voltage is then maintained until the gap between the opening contacts of switch 14 has reached sufficient spacing to support a significant voltage without breaking down.

The GTO switch 38 is then turned off such as by control means 50 applying, on conductor 54, a suitable negative voltage and current to the gate terminal of GTO 38. Current I2 then transfers from switch 38 to snubber capacitor C2 and diode D2, causing the voltage across capacitor C2 and switch 38 to rise rapidly to the clamping voltage of solid state varistor MOV. The value of capacitance of capacitor C2 is selected to limit the rate of rise of voltage to be compatible with the characteristics of both the GTO and the switch 14 to avoid conduction of either. When voltage V1 reaches the clamping voltage of varistor MOV, current I2 transfers to the MOV which then dissipates energy stored in the inductance of the load current path and forces the load current to zero. Thus the arrangement shown in FIG. 1 provides arcless interruption of d-c currents with provision for adapting to the characteristics of high-speed switch 14 by the selection of component values, precharge voltage, and timing of turn-off of the GTO.

It is highly desirable that the conductivity of transistor 60 be comparable with that of switch 14 in normal operation. Also the physics of the MOSFET transistor establishes an inverse relationship between conductivity and reverse avalanche voltage Vm of the parasitic diode 23. Therefore, operation at higher currents, where high conductivity is needed, requires selection of transistors having lower avalanche voltage. Although FIG. 1 shows a single transistor, it will be appreciated that a parallel array of multiple transistors may be used to achieve higher conductivity for application at higher currents. The ohmic nature of the MOSFET channel resistance facilitates operation of such transistors in a parallel array. Furthermore, the positive clamping voltage Vm is provided by the forward conduction of parasitic diode 23 which permits parallel operation of many devices with little risk of damage. Since operation in reverse avalanche is prevented by proper selection of precharge voltage $V_{cc}$, this arrangement avoids the need for the use of a separate voltage clamping device, such as a zener diode, between source and drain of the transistor array.

Figure 2:
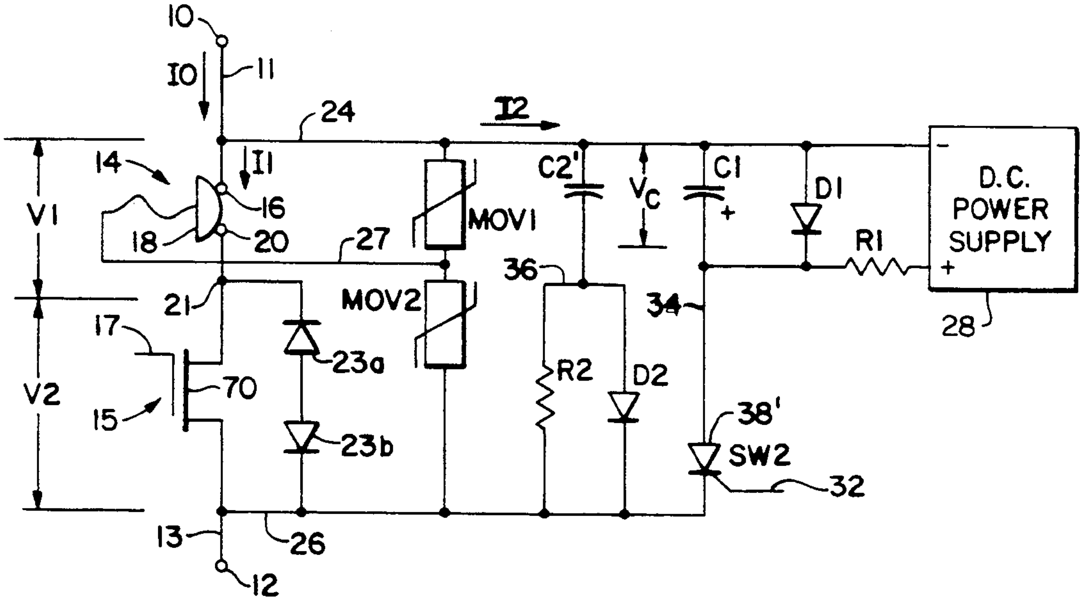
FIG. 2 is a schematic representation of an alternative embodiment using a bidirectional MOSFET transistor as the controlled impedance, and two varistors.

FIG. 2 is a further improvement of the arcless interruption system of FIG. 1, in which controlled impedance circuit 15 comprises a bidirectional n-channel enhancement mode MOSFET constructed in accordance with U.S. Pat. No. 4,961,100 entitled "Bidirectional Field Effect Semiconductor Device and Circuit" in the name of E. K. Howell, the subject applicant, and assigned to the assignee of the subject application and incorporated herein by reference. With such construction, transistor 70 has in parallel with it two inversely poled parasitic diodes in series, as shown as diode pair 23*a* and 23*b*. The maximum clamping voltage Vm for transistor 70 is then the reverse avalanche voltage of diode 23*a* or 23*b*, depending upon the polarity of voltage V2 applied across the main terminals of the transistor connected to conductors 21 and 13. While the operation of this system is similar to that described for FIG. 1, the essential difference is that when current I2 has transferred from capacitor C1 to diode D1, the voltage V2, which is the sum of the voltage drops across diode D1 and GTO 38', can be less than the positive clamping voltage Vm of transistor 15, hence current I1 through the switch 14 will remain zero as long as the second switch SW2, i.e. GTO 38', remains conducting. Thus, the time interval for arcless opening of switch 14 can be readily extended by simply delaying the turn-off of the GTO. It will be appreciated that solid state switch 38' may be any one of a number of solid state devices which exhibit controlled on and off states responsive to suitable control signals, such as bipolar transistors, field effect transistors, insulated gate transistors, field controlled thyristors, MOS controlled thyristors, field terminated diodes, etc.

FIG. 2 also shows the use of a similar power supply 28, resistor R1, capacitor C1, conductor 34. Two identical solid state varistors MOV1 and MOV2 connected in series from conductor 24 to conductor 26 and with the junction of the two varistors are connected by flexible conductor 27 to the bridging contact 18 of switch 14. When switch 14 is opened, bridging contact 18 is moved away from stationary contacts 16 and 20, forming two gaps which are electrically in series. When solid state switch 38' is turned off, voltage V1 across the pair of gaps in switch 14 rises at a rate determined by the load current I0 and capacitance of snubber capacitor C2', to the sum of the clamping voltages of the pair of varistors MOV1 and MOV2. As voltage V1 is rising, the inherent capacitance of the two varistors forms a capacitive voltage divider at the junction of the two varistors which, by conductor 27 to bridging contact 18 forces the two gaps to share the applied voltage V1 approximately equally. When voltage V1 reaches the clamping voltage of the varistor pair, current I2 then flows through the varistors with approximately equal voltage drop across each, thus maintaining the division of voltage across the two gaps. Since the relationship of breakdown voltage to gap spacing is non-linear, as depicted by the well known Paschen Curve, the equal division of voltage across the two series gaps results in the highest total breakdown voltage, as compared with any non-equal division. Thus, this connection of varistors to the switch 14 provides the maximum breakdown voltage characteristic, which permits voltage V1 to start rising earlier and to rise at a faster rate, thereby allowing shorter conduction time of switch 38' and use of a smaller capacitance for capacitor C2'. FIG. 2 further illustrates an alternative connection for the snubber network in which snubber capacitor C2' is connected from conductor 24 to conductor 36 and through the parallel combination of diode D2 and resistor R2 to conductor 26. This connection provides the primary advantage of avoiding having capacitor C2' charged to the precharge voltage $V_{cc}$ impressed upon capacitor C1.

Figure 3:
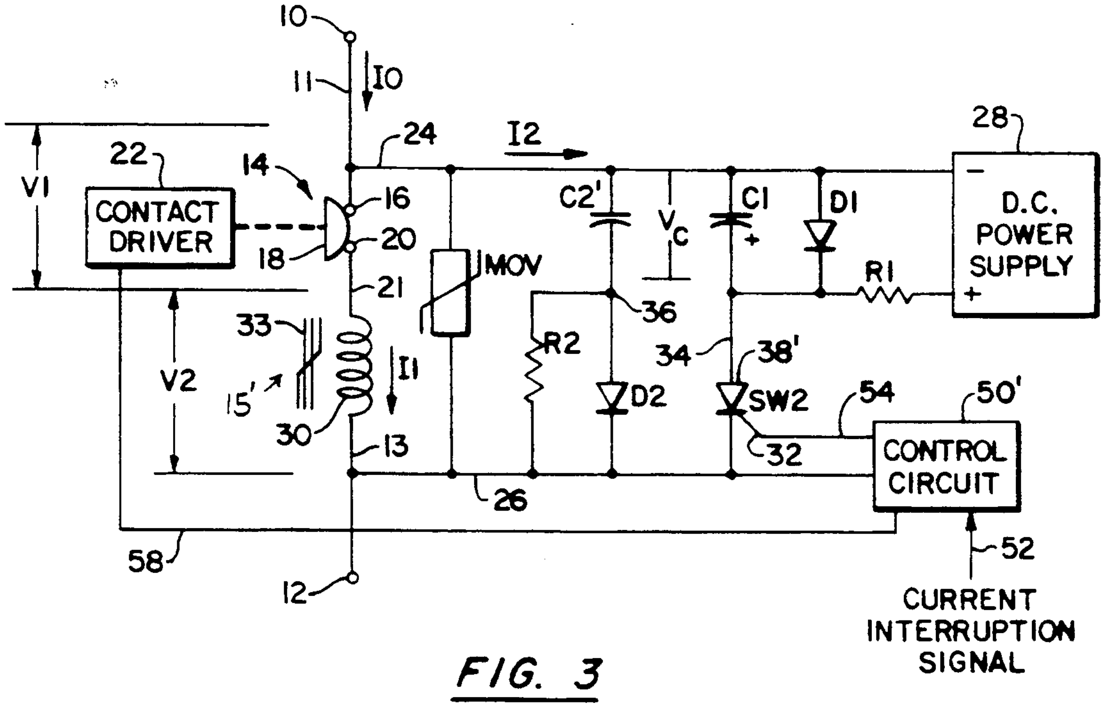
FIG. 3 is a schematic representation of an alternative embodiment using a saturable reactor as the controlled impedance.

FIG. 3 illustrates an interruption arrangement wherein controlled impedance 15' comprises a saturable reactor. The latter preferably comprises a single wire conductor 30 surrounded by a torroidal core 33 of ferromagnetic material extending about the conductor without any substantial air gap within the core. Core 33 is of material having high permeability and very low coercivity. During normal operation, load current flow through conductor 30 maintains the saturable reactor 15' in saturation, i.e. in a low impedance state. When interruption is commanded, the reverse current discharged by capacitor C1, upon closure of the second switch SW2, i.e. GTO 38′, produces a sufficient reversal of current I1 in conductor 30 to drive saturable reactor 15′ out of saturation into an unsaturated, high impedance, state. Thus saturable reactor 15′ is switched from a low impedance to a high impedance state without requiring a separate control signal, i.e. of the type required to switch solid state devices in controlled impedance circuits of the type illustrated in FIGS. 1 and 2. The sudden increase of reactor impedance, produced by discharge of capacitor C1, limits the magnitude of I1 temporarily to a sufficiently low value to permit high speed switch 14 to be opened without arcing. Bridging contact 18 of high speed switch 14 can be opened from fixed contacts 16 and 20 while the voltage across the parting gaps is maintained sufficiently low to prevent voltage breakdown across the parting contacts.

The circuit of FIG. 3 is similar to that of FIGS. 1 and 2. Terminals 10 and 12 are adapted for connection to an external circuit comprising the power source and load. These terminals are interconnected by conductor 11, high-speed mechanical switch 14, saturable reactor 15′, and conductor 13. High-speed switch 14 comprises fixed stationary contacts 16 and 20, and a movable bridging contact 18 operable by magnetic contact driver 22. A current pulse forming network comprising a series circuit of capacitor C1, conductor 34, and a solid state switch 38′ capable of turning off the full load current, shown here as gate-turn-off thyristor GTO, is connected by conductors 24 and 26 to conductors 11 and 13, in parallel with the network of switch 14 and saturable reactor 15′. A control circuit 50′ receives a current interruption signal on line 52. The control circuit provides, on conductors 26 and 54, signals suitable for causing switch 38′ to turn on and to subsequently turn off, to gate 32 and cathode conductor 26. A diode D1 is connected in parallel with capacitor C1, having the anode connected to conductor 24 and the cathode connected to conductor 34. A d-c power supply 28 is connected to capacitor C1 through current limiting resistor R1 to precharge capacitor C1 to a predetermined voltage $V_{CC}$. A snubber network comprising capacitor C2′ in series with the parallel combination of a diode D2 and a resistor R2, is connected between conductors 24 and 26. Optionally, but preferably, a voltage clamping device such as a metal oxide varistor (MOV) is also connected across conductors 24 and 26.

In normal operation, load current flows from terminal 10, through conductor 11, switch 14, saturable reactor 15′, and conductor 13 to terminal 12, as indicated by current vectors I0 and I1, with a voltage drop across the switch 14, indicated by voltage vector V1, which is typically less than 100 millivolts. Under steady state conditions, the load current flowing through saturable reactor 15′ maintains it in saturated condition wherein its inductance L1 is very low. Capacitor C1 is precharged to voltage $V_{cc}$, with conductor 34 positive with respect to conductor 24, creating a reverse bias on diode D1. Conductor 34 then has a positive voltage, equal to the sum of V1 and $V_{cc}$, with respect to conductor 26, which voltage is a forward bias impressed upon switch 38′. When the load current is to be interrupted by means of conductor 52, solid state switch 38′ is turned on, such as by application of a suitable positive gate signal to the GTO by control circuit 50′, thereby causing capacitor C1 to discharge current, indicated by current vector I2, through conductor 34, switch 38′, conductors 26 and 13, saturable reactor 15′, the closed switch 14, and conductors 11 and 24. Current pulse I2 rises on a sinusoidal wave having a frequency determined by the natural resonance of capacitor C1 and the saturated inductance L of saturable reactor 15′ plus the loop inductance of the path of current I2. Since the direction of I2 in switch 14 and reactor 15′ is opposite to that of load current I0, the net current in switch 14, and in reactor 15′, is the difference between I0 and I2. When the magnitude of I2 becomes equal to that of I0, net current I1 in the switch and the reactor becomes zero. Current I2 then continues to increase, causing a reversal of I1 current in saturable reactor 15′ which results in a very large increase in inductance L. The high value of the unsaturated inductance L of reactor 15′ limits further increase in I2, hence also limits the reverse current to a very low value in both reactor 15′ and switch 14. At this point, current I2 in the capacitor C1 is essentially equal to load current I0. For the case wherein load current is virtually constant during the time frame of the interruption, then I2 becomes constant and the voltage V2 and the voltage $V_C$ across capacitor C1 change linearly with time, going from the initial charge $V_{cc}$, at a first polarity, to zero, then reversing and increasing in a second polarity, which is the same polarity as the supply voltage, until the forward bias on diode D1 causes all of current I2 to flow through diode D1. Since diode D1 limits the reverse voltage on capacitor C1 to about one volt, capacitor C1 may be a unipolar, i.e. polarized electrolytic type, having a relatively high value of capacitance and a low voltage rating, thus the precharge voltage $V_{cc}$ may be made relatively low, i.e. less then minimum arc voltage.

When switch current I1 is small and capacitor voltage $V_C$ is less than minimum arc voltage, switch 14 may be opened by application of a suitable signal to the contact driver 22, with no arcing nor contact deterioration. This switch opening signal may be applied from control circuit 50′ by conductor 58. When switch 14 has reached a gap spacing of sufficient breakdown voltage strength, second switch, GTO 38′, is turned off by a suitable negative signal applied to gate 32 by conductor 54 from control circuit 50′, causing load current I0 (=I2) to transfer to the snubber network, charging capacitor C2′ through diode D2 connected at junction 36. Capacitor C2′ is chosen to limit the rate of change of voltage to a value which will allow both the GTO and the switch 14 to remain non-conducting, hence is typically of much smaller capacitance than C1, but with a higher voltage rating. Since the power source and the load circuit generally possess inductance, the peak voltage to which capacitor C2′ is charged by load current I0 is typically higher than the voltage of the power source, and may be many times that voltage. In order to limit the voltage applied to switches 14 and 38 and to capacitor C2′, varistor MOV is arranged to conduct current I2 when voltage V1 exceeds the power source voltage by a predetermined amount. The varistor must then dissipate the magnetic energy stored in source and load inductance. The time available for opening switch 14 is the time interval during which capacitor C1 voltage $V_C$ is less than minimum arc voltage, i.e. 12 volts. Since voltage $V_{CC}$ may be only 10 volts and $V_C$ is changing on a linear ramp, the time to traverse from negative 10 volts to positive 1 volt is given by $t=C1(v2-v1)/i$. For example, with capacitor C1 of 1000 microfarads, capacitor C2′ of 10 microfarads, and current of 100 amperes, the time is $t=1000*10^{-6}*11/100=110*10^{-6}$ or 110 microseconds. Furthermore, the conduction of load current through the diode D1 and the GTO limits the voltage V1 across the switch 14 and reactor 15′ to about 4 volts, hence the GTO can be held in the conducting mode until switch 14 has opened, provided that reactor 15′ remains out of saturation. When the GTO is turned off, the load current will charge capacitor C2′ at the rate of $dv/dt=i/C2=100/(10*10^{-6})=10*10^6$ or ten volts per microsecond, using the preceding example, until the clamping voltage of the varistor MOV is reached, at which point load current transfers to the varistor which dissipates the remaining energy stored in load and power source inductance.

The circuit of FIG. 3 may be modified by substituting a different type of solid state switch, such as an n-p-n bipolar transistor, for GTO switch 38′. If such a transistor is substituted, control circuit 50′ would provide suitable base drive to the transistor to initiate, maintain and terminate conduction at the right time.

Figure 4:
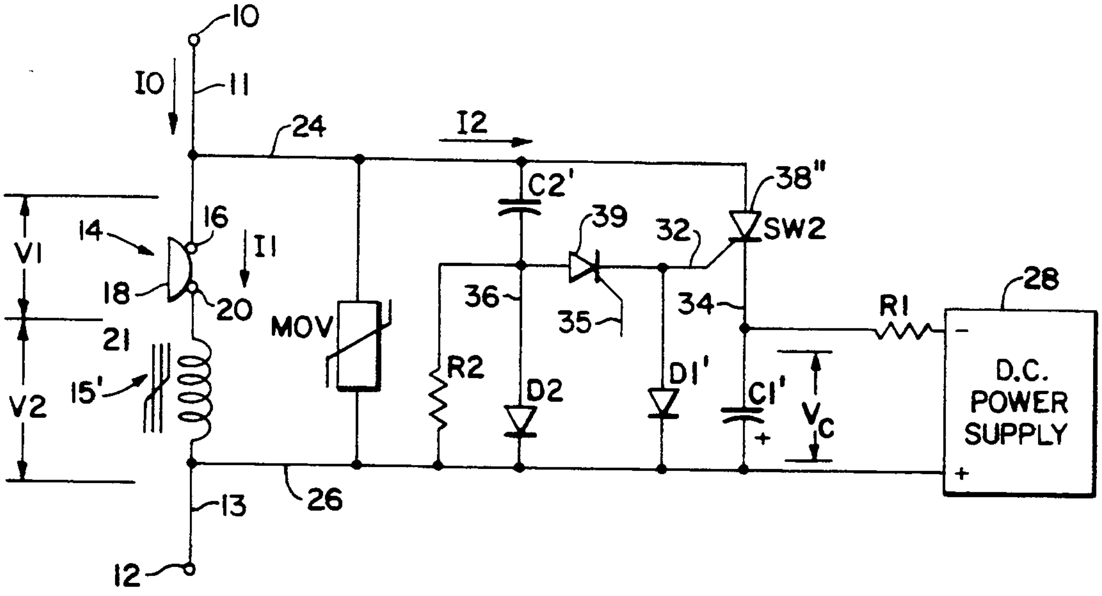
FIG. 4 is a schematic representation of an alternative embodiment providing for controlling turn-on and turn-off of the GTO thyristor controlling capacitor commutation.

FIG. 4 illustrates an alternative switching arrangement for FIG. 3 in which alternate provision is made for both turning on and turning off the second switch SW2, i.e. GTO 38″. GTO 38″ has its anode connected to conductor 24 and its cathode connected to conductor 34. Capacitor C1′ is connected between conductor 34, i.e. the cathode of GTO 38″, and conductor 26. DC power supply 28 has its negative output connected through resistor R1 to conductor 34 and its positive output connected to conductor 26. It precharges capacitor C1′ through resistor R1 to a pre-determined voltage $V_{cc}$. Diode D1′ has its anode connected to gate 32 of GTO 38″ and its cathode connected to conductor 26. A pilot, or low-current, solid state switch 39, depicted here as a thyristor, i.e. SCR, has its anode connected to snubber network conductor 36 and its cathode connected to the GTO gate 32.

In normal operation, load current flows from terminal 10, through conductor 11, high speed switch 14, saturable reactor 15′, and conductor 13 to terminal 12, as indicated by current vectors I0 and I1. The voltage drop across switch 14, indicated by voltage vector V1, is then typically less than 100 millivolts. Under steady state conditions, the load current flowing through saturable reactor 15′ maintains it in the saturated condition wherein its inductance L1 is very low. Capacitor C1′ is precharged to voltage $V_{cc}$, with conductor 34 negative with respect to conductor 26, creating a reverse bias on diode D1′, and a forward bias on GTO switch 38″, and on SCR switch 39.

When the load current is to be interrupted, the SCR switch 39 is turned on, such as by application of a suitable positive gate signal to the Gate 35 by a control circuit, not shown in FIG. 4. This causes a charging current through capacitor C2′, the gate 32 of GTO 38″, the cathode of GTO 38″, conductor 34 and precharged capacitor C1′. This current renders GTO 38″ conductive. Upon conduction of GTO 38″, capacitor C1′ discharges current, indicated by current vector I2, through conductors 26 and 13, saturable reactor 15′, the closed switch 14, conductors 11 and 24, GTO 38″ and conductor 34. Current pulse I2 rises on a sinusoidal wave having a frequency determined by the natural resonance of capacitor C1′ and the saturated inductance L of saturable reactor 15′ plus the loop inductance of the path of current I2. Since the direction of I2 in switch 14 and reactor 15′ is opposite to that of load current I0, the net current I1 in switch 14, and in reactor 15′, is the difference between I0 and I2. When the magnitude of I2 becomes equal to that of I0, net current I1 in the switch and the reactor becomes zero. Current I2 then continues to slightly increase, causing a reversal of current I1 in saturable reactor 15′ which results in a very large increase in inductance L. The high value of the unsaturated inductance L of reactor 15′ limits further increase in I2, hence also limits the reverse current I1 to a very low value in both reactor 15′ and switch 14. At this point, current I2 in the capacitor C1′ is essentially equal to load current I0. For the case wherein load current is virtually constant during the time frame of the interruption, then I2 becomes constant and the voltage V1 and the voltage $V_c$ across capacitor C1′ change linearly with time, going from the initial charge $V_{cc}$, of a first polarity, to zero, then reversing and increasing in a second polarity, i.e. the same polarity as the supply voltage. Since, during conduction of GTO 38″, the potential of its gate 32 is about one volt positive with respect to cathode 34, reversal of polarity of capacitor C1′ voltage $V_c$ produces a forward bias on diode D1′ which causes all of current I2 to flow out of the GTO gate 32 through diode D1′ thereby turning off GTO 38″. Since diode D1′ limits the reverse voltage on capacitor C1′ to about one volt, capacitor C1′ may be a polarized electrolytic type, having a relatively high value of capacitance and a low voltage rating. Thus the precharge voltage $V_{cc}$ may be made relatively low, i.e. less than minimum arc voltage. When switch current I1 is small and capacitor voltage $V_c$ is less than minimum arc voltage, switch 14 may be opened with no arcing nor contact deterioration. Provided that switch 14 has reached a gap spacing of sufficient breakdown voltage strength, when GTO 38″ is turned off, load current I0 (=I2) transfers to the snubber network, charging capacitor C2′ through diode D2. Capacitor C2′ is chosen to limit the rate of change of voltage to a value which will allow both GTO 38″ and the switch 14 to remain non-conducting, hence is typically of much smaller capacitance then C1′, but with a higher voltage rating. Since the power source and the load circuit generally possess inductance, the peak voltage to which capacitor C2′ is charged by load current I0 is typically higher than the voltage of the power source, and may be many times that voltage. In order to limit the voltage applied to the switches 14 and 38″, varistor MOV is arranged to conduct current I2 when voltage V1 exceeds power source voltage by a pre-determined amount. The varistor must then dissipate the magnetic energy stored in source and load inductance. The time available for opening switch 14 is the time interval during which the voltage $V_c$ of capacitor C1′ is less than minimum arc voltage, i.e. 12 volts. Since voltage $V_{cc}$ may be only 10 volts and $V_c$ is changing on a linear ramp, the time to traverse from negative 10 volts to positive 1 volt is given by $t=C1'*(v2-v1)/I$. For example, with capacitor C1′ of 1000 microfarads, capacitor C2′ of 10 microfarads, and load current of 100 amperes, the time is $t=1000\ 10^{-6}*11/100=110*10^{-6}$ or 110 microseconds. However, switch 14 must open sufficiently to achieve adequate breakdown voltage strength before the GTO is turned off by the charging of capacitor C1′. When the GTO is turned off, the load current will charge capacitor C2′ at the rate of $dv/dt=i/C2'=100/(10*10^{-6})=10*10^6$ or ten volts per microsecond, using the preceding example, until the clamping voltage of the varistor MOV is reached. At this point load current transfers to the varistor which dissipates the remaining energy stored in load and power source inductance. The bridging contact 18 and fixed contacts 16, 20 behave in the manner earlier described.

Figure 5:
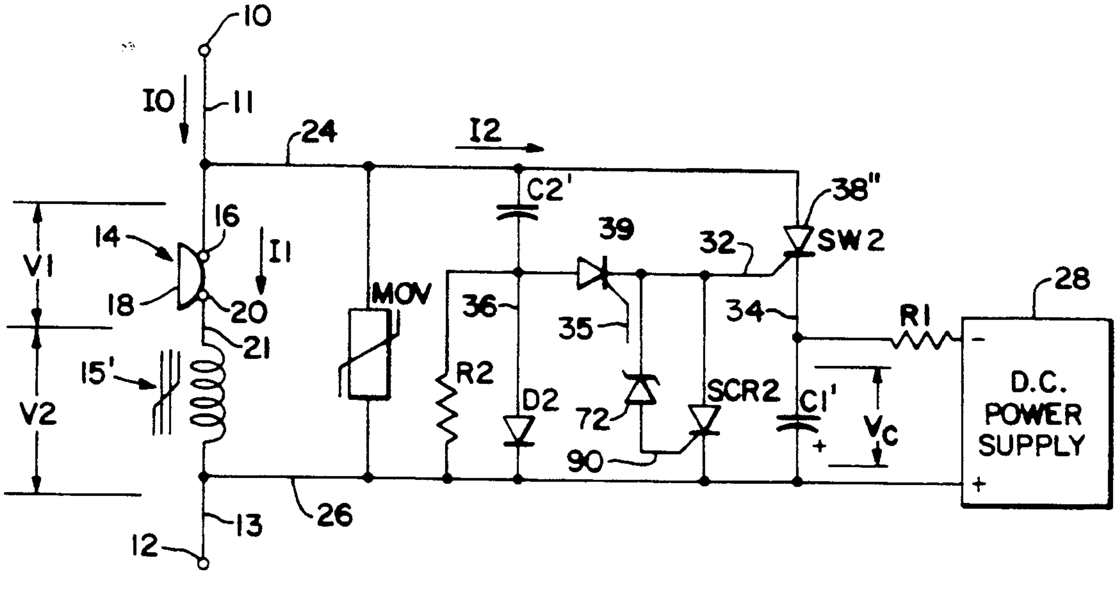
FIG. 5 is a schematic representation of modification of the embodiment of FIG. 4 using a thyristor to turn off the GTO thyristor.

FIG. 5 depicts an improved alternative to FIG. 4, in which the diode D1′ of FIG. 4 is replaced in FIG. 5 by a second thyristor, SCR2. SCR2 has its anode connected to the junction of gate 32 of GTO 38″ and the cathode of SCR 39. A low-voltage zener diode 72 has its anode connected to gate 90 of SCR2 and its cathode connected to conductor 32, at the junction of the anode of SCR2 and the cathode of SCR 39. The operation of FIG. 5 is identical to that of FIG. 4 up to the point where the voltage $V_c$ across capacitor C1′ reverses polarity and the positive potential of GTO gate 32, with respect to conductor 26, applies a forward bias to SCR2 and a reverse bias to zener diode 72. When the reverse bias on zener diode 72 reaches the zener (or avalanche, or clamping) voltage of 5.6 volts, zener diode 72 conducts current into the gate of SCR2 causing it to turn on, abruptly decreasing the potential of GTO gate 32 and diverting current I2 from GTO cathode 34 to gate 32 through SCR2. The rapid switching action of SCR2 also results in a momentary reverse recovery current which rapidly clears stored charge from the gate-cathode junction of GTO 38″, resulting in less power loss in the GTO 38″ than in the simple gate diode arrangement of FIG. 4. Furthermore, the turn-off of GTO 38″ is delayed by the time needed to charge capacitor C1′ to the requisite zener voltage, thus allowing more time for switch 14 to separate. However, the reversal of polarity of capacitor C1′ prohibits the use of a polarized electrolytic type construction for that capacitor. The time at which GTO 38″ is turned off is dependent upon the magnitude of the load current in this embodiment. The other components shown in FIG. 5 have similar counterparts in FIG. 4 and are provided with identical reference numbers.

Figure 6:
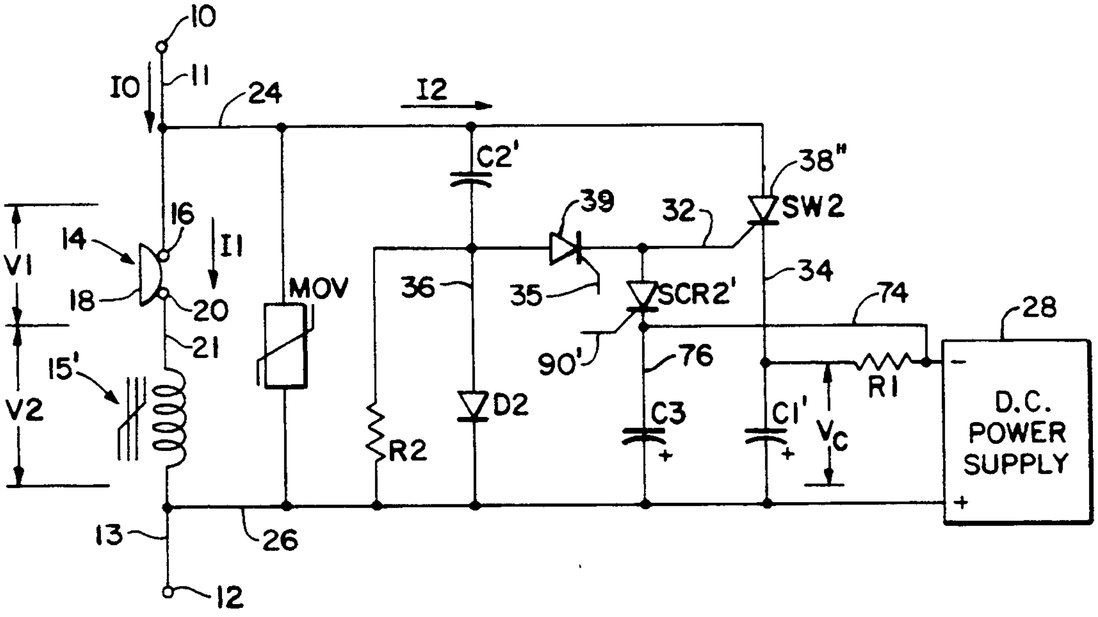
FIG. 6 is a schematic representation of modification of the embodiment of FIG. 5 using a second precharged capacitor to turn off the GTO thyristor.

FIG. 6 illustrates an improvement over FIG. 5 in which the time at which GTO 38″ is turned off may be fixed and independent of load current, within a predetermined range. This is accomplished by the addition of a third capacitor, C3, in series with the cathode of SCR2′ and precharged to $V_{cc}$ by power supply 28. Specifically, one lead of capacitor C3 is connected by conductor 76 to the cathode of SCR2′ and the other lead is connected to conductor 26. Conductor 74 connects the junction 76 of capacitor C3 and of the cathode of SCR2′ to the negative output of power supply 28. Since the positive terminal of power supply 28 is connected to conductor 26, capacitor C3 is precharged so that its junction with the cathode of SCR2′ is negative with respect to conductor 26. The circuit of FIG. 6 does not utilize the zener diode 72 of FIG. 5. Instead the gate electrode 90′ of SCR2′ receives a signal to turn off GTO 38″. The reversal of voltage $V_c$ on capacitor C1′ may be avoided by selection of a sufficiently large value of capacitance for that capacitor, thereby permitting the use of a polarized electrolytic type. Alternatively, reverse voltage on C1′ may be limited by use of a diode in parallel with C1′, as shown by diode D1 in FIG. 3. At the time the GTO 38″ is to be turned off, SCR2′ will have a forward bias equal to the change in voltage $V_c$ on capacitor C1, as the result of, hence proportional to, load current I2 during the time that GTO 38″ has been conducting. A suitable control signal applied to gate 90′ of SCR2′ then turns on SCR2′ and diverts load current 12 from GTO cathode 34 to GTO gate 32, SCR2′, and capacitor C3, thus turning off GTO 38″. The circuit components are similar to those depicted in FIG. 5 and have identical reference numbers.

Figure 7:
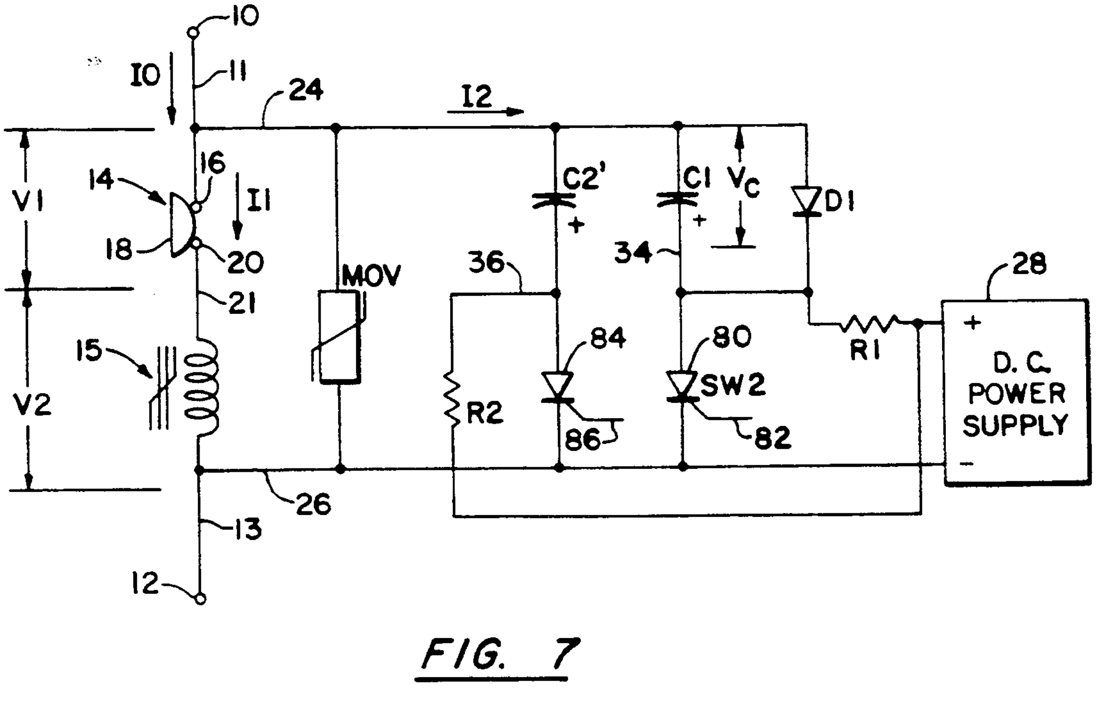
FIG. 7 is a schematic representation of the embodiment in which a pair of SCR thyristors with capacitor commutation replace the GTO thyristor.

FIG. 7 illustrates an alternative switching arrangement to that of FIG. 3 in which for the solid state switch SW2, the gate-turnoff thyristor, GTO 38′, is replaced by a first SCR, i.e. conventional thyristor, 80 having a gate terminal 82. Diode D2 of the snubber network, of FIG. 3, is replaced by a second solid state switch comprising a conventional thyristor, i.e. SCR, 84 having a gate electrode 86. Further, d-c power supply 28 is arranged to precharge snubber capacitor C2′ through current limiting resistor R2. Specifically, resistor R2 is connected from the positive terminal of power supply 28 to conductor 36 at the junction of capacitor C2′ and the anode of thyristor 84. The positive terminal of the power supply is also connected through current limiting resistor R1 to conductor 34, at the junction of capacitor C1 and the anode of SCR 80. The negative terminal of the power supply is connected to conductor 26, and thus the cathodes of thyristors 80 and 84.

In this arrangement, the second thyristor 84 is used to commutate, or turn off, the first thyristor, 80 by the application of the reverse voltage stored on the commutating capacitor C2′ The latter also serves the function of a snubber capacitor in limiting the rate of change of voltage across the circuit after commutation. The operation of the circuit of FIG. 7 is identical to that of FIG. 3 up to the point where switch 14 has been opened and switch SW2 (GTO 38′ of FIG. 3 and SCR 80 of FIG. 7) is to be turned off. Switch SW2, i.e. SCR 80, is turned off by turning on the other switch, i.e. SCR 84, by applying a suitable signal to the gate 35 of SCR 84. This applies the precharge voltage $V_{cc}$ on capacitor C2′ as a reverse bias on switch SW2, i.e. SCR 80. This sweeps out stored charge in SCR 80 and transfers the current I2 from diode D1 and SCR 80 to capacitor C2′ and SCR 84. Current I2 then discharges capacitor C2′ from the precharge voltage $V_{cc}$ to zero on a linear ramp, then charges capacitor C2′ in the polarity of the supply voltage until the clamping voltage of varistor MOV is reached. The magnitude of capacitor C2′ is chosen, in conjunction with maximum load current I0 and precharge voltage $V_{cc}$, to provide sufficient time for SCR 80 to recover complete blocking capability before it becomes forward biased, when capacitor C2′ voltage is zero, and to limit the rate of change of forward bias voltage, as capacitor C2′ is charged toward supply voltage. The other components within FIG. 7 are similar to those of FIG. 3 and have the same reference numbers.

It should be apparent to those skilled in the art that additional changes may be made in the disclosed embodiments without departing from the true spirit and scope of the invention.

What I claim as new and desire to secure by Letters Patent of the United States is:

1. In a circuit interrupter for interrupting load current flow in a power line connected in series circuit between a source electric power and a load, comprising:

first switching means comprising separable contacts normally maintained in closed position;

controlled impedance means serially connected with said separable contacts to comprise therewith a network for conduction of load current between a source of electric power and a load;

said controlled impedance means providing a first impedance and thus a first voltage drop during the normal flow of load current but being capable of being switched to provide a second impedance higher than said first impedance in response to a current interruption signal;

a current diversion circuit connected across said network having first capacitance means precharged to a predetermined voltage of a first polarity and second switching means connected in series with said capacitance means across said network;

said second switching means being normally open until closed by a current interruption signal to discharge said first capacitance means through said network to supply to said network a pulse sufficient to reduce current through said network to a first current value and, in conjunction with said controlled impedance means being switched to said second impedance, to divert load current from said network to said current diversion circuit to permit said separable contacts to open without arcing;

said first switching means having actuating means for opening said separable contacts subsequent to the diversion of load current whereupon the voltage across said separable contacts approximates the variable voltage across said first capacitance means, which responsive to the diverted load current, descends from the predetermined voltage of a first polarity to zero and the ascends in amplitude with a second polarity, corresponding to the polarity of the source of electric power;

turn off means for turning off said second switching means subsequent to said separable contacts having opened while the voltage of second polarity across said first capacitance means, and thus the voltage across said separable contacts prevented voltage breakdown across the contacts; circuit means to divert energy, remaining from load current in the current diversion circuit, from the open second switching means and to dissipate such energy, said circuit means comprising voltage clamping means and snubber means, said snubber means diverting energy from said second switching means upon its opening and causing the voltage across said first capacitance means and said second switching means to rise above the magnitude of the voltage of a source of electric power to cause said voltage clamping means to conduct and dissipate the electrical energy remaining in the network, said controlled impedance means comprising a field effect transistor having source drain and gate electrodes and a pair of oppositely poled parasitic diodes in series circuit across said source and drain electrodes, said source and drain electrodes being connected in circuit with said first switching means, said gate electrode being connected to receive a signal responsive to a load current interruption command, to increase the voltage across said source and drain electrodes, said separable contacts comprising first and second fixed contacts and a movable bridging contact and said voltage clamping means comprising first and second varistor devices connected in series circuit across said network, said separable contacts further comprising a flexible connection from the junction of said first and second varistor devices to said bridging contact such that upon opening of said bridging contact and said second switching means the first and second varistor devices equally share the voltage across said varistor devices to maximize the breakdown voltage across the varistor devices.

2. The circuit interrupter of claim 1 wherein said second switching means comprises a solid state gate turn off device having anode and cathode terminals and at least one gate terminal; said anode and cathode terminals being connected in series circuit with said first capacitance means and said network and said at least one gate terminal being biased, in response to a current interruption signal, to turn on the device and, upon opening of said separable contacts, being biased to turn off the device.

3. The circuit interrupter of claim 1, wherein said first capacitance means comprises a capacitor connected for operation with voltage of the first polarity and wherein the second unilaterally conducting means limits the voltage of second polarity to a sufficiently low magnitude to permit use of such a capacitor.

4. In a circuit interrupter for interrupting load current flow in a power line connected in series circuit between a source of electric power and a load, comprising:

first switching means comprising separable contacts normally maintained in closed position;

controlled impedance means serially connected with said separable contacts to comprise therewith a network for conduction of load current between a source of electric power and a load;

said controlled impedance means providing a first impedance and thus a first voltage drop during the normal flow of load current, but being capable of being switched to provide a second impedance higher than said first impedance in response to a current interruption signal;

a current diversion circuit connected across said network having first capacitance means precharged to a predetermined voltage of a first polarity and second switching means connected in series with said capacitance means across said network;

said second switching means being normally open until closed by a current interruption signal to discharge said first capacitance means through said network to supply to said network a pulse sufficient to reduce current through said network to a first current value and, in conjunction with said controlled impedance means being switched to said second impedance, to divert load current from said network to said current diversion circuit to permit said separable contacts to open without arcing;

said first switching means having actuating means for opening said separable contacts subsequent to the diversion of load current whereupon the voltage across said separable contacts approximates the variable voltage across said first capacitance means, which responsive to the diverted load current, descends from the predetermined voltage of a first polarity to zero add then ascends in amplitude with a second polarity, corresponding to the polarity of the source electric power;

turn off means for turning off said second switching means subsequent to said separable contacts having opened while the voltage of second polarity across said first capacitance means, and thus the voltage across said separable contacts was sufficiently low to prevented voltage breakdown across the contacts; circuit means to divert energy, remaining from load current in the current diversion circuit, from the open second switching means and to dissipate such energy, second unilaterally conducting means coupled in circuit across said first capacitance means and poled for conduction upon application of a voltage of a second polarity to limit the voltage across said first capacitance means to a sufficiently low magnitude of a second polarity to permit said separable contacts to open fully without the voltage across said separable contacts attaining a magnitude sufficient to cause arcing, said second switching means comprising gate turn off device having anode, cathode and gate terminals, said anode and cathode terminals being connected in series circuit with said first capacitance means, and wherein said second unilaterally conducting means is coupled across a series circuit comprising said gate and cathode terminals and the first capacitance means so that said second unilaterally conducting means conducts upon reversal of polarity of the voltage across said capacitance means and cuts off said gate turn off device, said circuit means to divert energy comprising snubber means for diverting energy from said gate turn off device upon the latter being opened; said snubber means comprising second capacitance means and first unilaterally conducting means in a series circuit coupled in parallel with the series circuit comprising the anode and cathode terminals of said gate turn off device and said first capacitance means comprising third unilaterally conducting means having anode and cathode terminals connected in circuit from the gate electrode of said gate turn off device to the junction of said second capacitance means and said first unilaterally conducting means so as to be forward biased during the normal flow of load current; said third unilaterally conducting device having a gate terminal connected to receive a current interruption signal to turn on said third unilaterally conducting means and to thus turn on said gate turn off device.

5. In a circuit interrupter for interrupting load current flow in a power line connected in series circuit between a source of electric power and a load, comprising:

first switching means comprising separable contacts normally maintained in closed position;

controlled impedance means serially connected with said separable contacts to comprise therewith a network for conduction of load current between a source of electric power and a load;

said controlled impedance means providing a first impedance and thus a first voltage drop during the normal flow of load current, but being capable of being switched to provide a second impedance higher that said first impedance in response to a current interruption signal;

a current diversion circuit connected across said network having first capacitance means precharged to a predetermined voltage of a first polarity and second switching means connected in series with said capacitance means across said network;

said second switching means being normally open until closed by a current interruption signal to discharge said first capacitance means through said network to supply to said network a pulse sufficient to reduce current through said network to a first current value and, in conjunction with said controlled impedance means being switched to said second impedance, to divert load current from said network to said current diversion circuit to permit said separable contacts to open without arcing;

said first switching means having actuating means for opening said separable contacts subsequent to the diversion of load current whereupon the voltage across said separable contacts approximates the variable voltage across said first capacitance means which responsive to the diverted load current, descends from the predetermined voltage of a first polarity to zero and then ascends in amplitude with a second polarity, corresponding to the polarity of the source of electric power;

turn off means for turning off said second switching means subsequent to said separable contacts having opened while the voltage of second polarity across said first capacitance means, and thus the voltage across said separable contacts prevented voltage breakdown across the contacts;

circuit means to divert energy, remaining from load current in the current diversion circuit, from the open second switching means and to dissipate such energy, said circuit means comprising voltage clamping means and snubber means; said snubber means diverting energy from said second switching means upon its opening and causing the voltage across said first capacitance means add said second switching means to rise above the magnitude of the voltage of a source of electric power to cause said voltage clamping means to conduct and dissipate the electrical energy remaining in the network, said snubber means comprising second capacitance means and first unilaterally conducting means serially connected to transfer remaining energy from the open second switching means; said second switching means and said first unilaterally conducting means, respectively, are a first and a second thyristor each having anode, cathode and gate electrodes, said anode and cathode of said second switching means being connected in series circuit with said first capacitance means; said gate electrode of said second switching means being connected receive a load current interruption signal to gate on said second switching means; the anode and cathode electrodes of said second unilaterally conducting device being connected in series circuit with said second capacitance means across the series combination of said first capacitance means and said second switching means;

means to pre-charge said second capacitance means to forward bias said first unilaterally conducting means; and said gate electrode of said second unilaterally conducting means receiving a gating signal upon opening of said first switching means for turning on said second unilaterally conducting means and to thus apply the charge on said second capacitance means to reverse bias and cut off said second switching means;

first unidirectional means connected across said first capacitance means and poled for conduction upon application of a voltage of second polarity, wherein the means for opening said second switching means is activated responsive a circuit condition indicative that the first switching means should have opened.

* * * * *